Feb. 7, 1939.  G. H. SMITH ET AL  2,146,273
PRESSURE REGULATING AND REDUCING APPARATUS
Filed Jan. 24, 1933  5 Sheets-Sheet 1
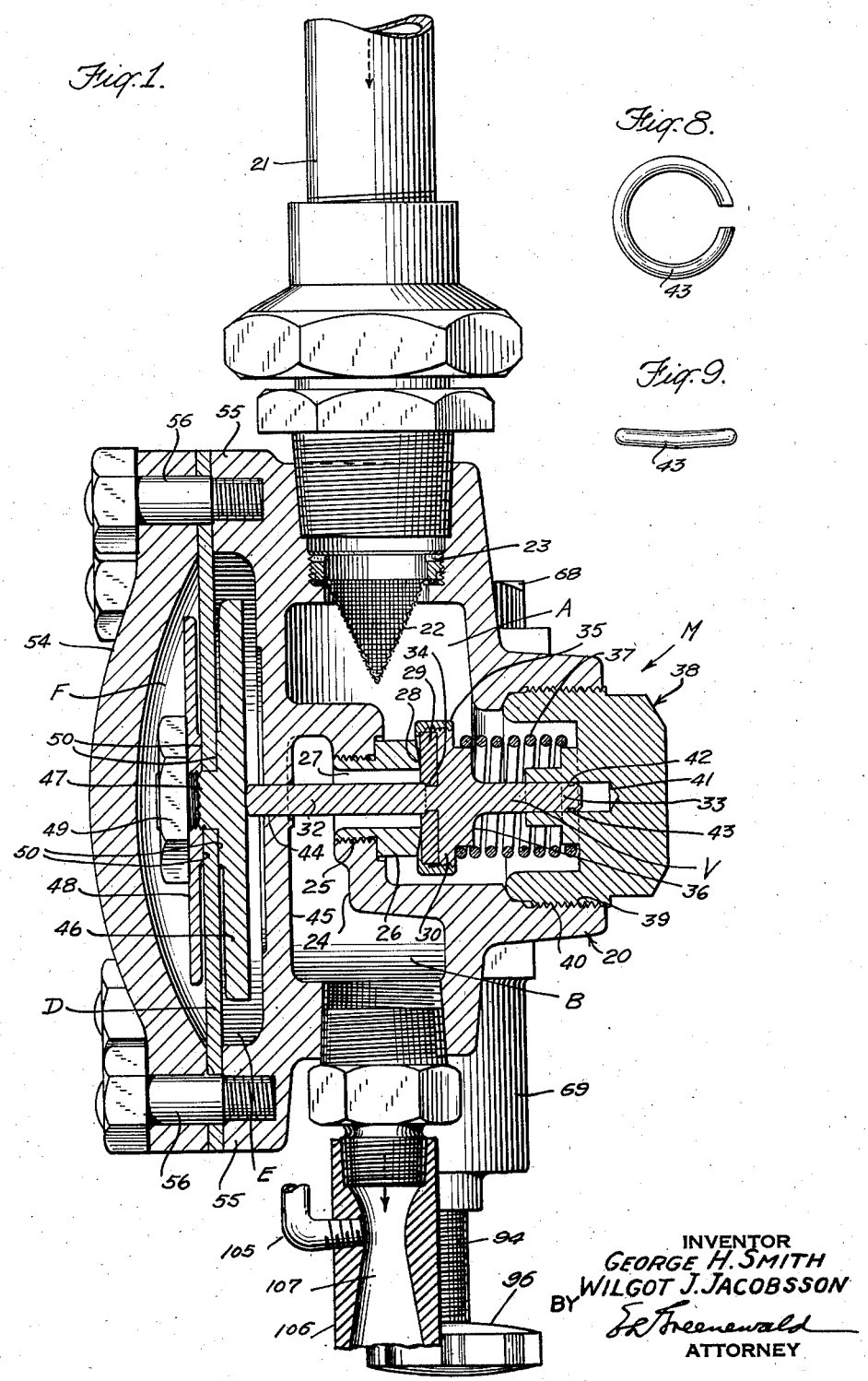
INVENTOR
GEORGE H. SMITH
WILGOT J. JACOBSSON
BY
ATTORNEY Feb. 7, 1939.  G. H. SMITH ET AL  2,146,273
PRESSURE REGULATING AND REDUCING APPARATUS
Filed Jan. 24, 1933  5 Sheets-Sheet 2
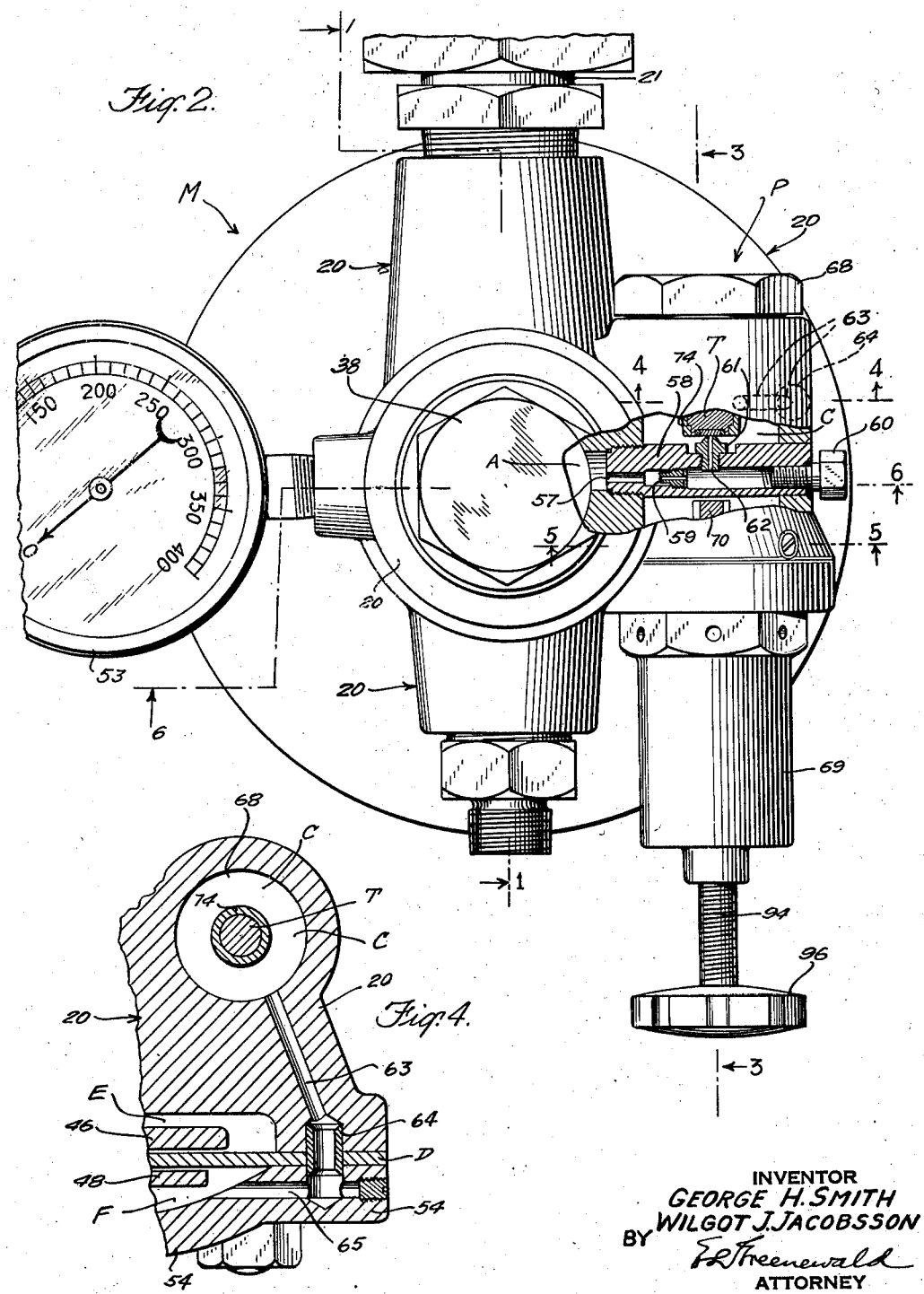
INVENTOR
GEORGE H. SMITH
WILGOT J. JACOBSSON
BY
ATTORNEY

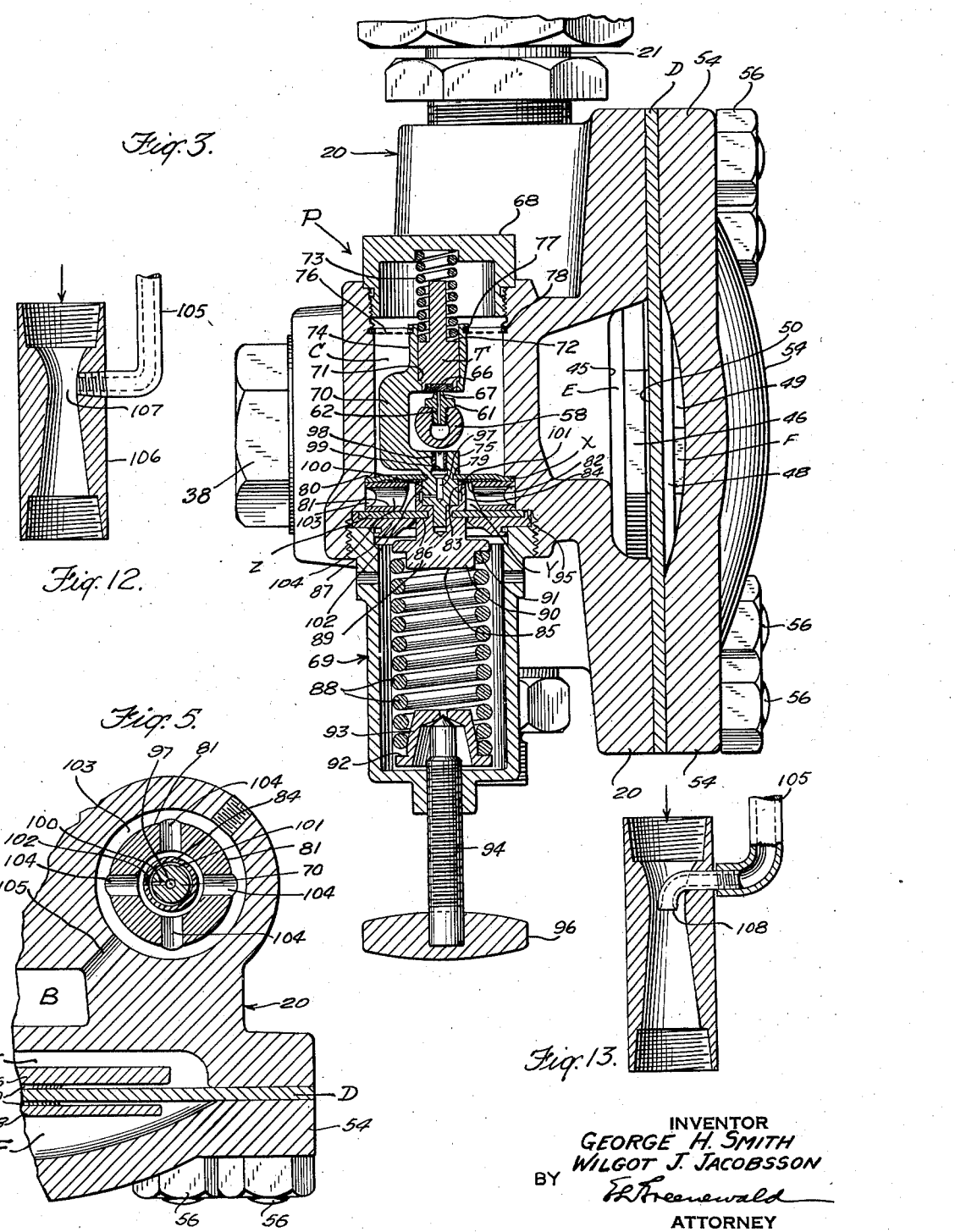

Feb. 7, 1939.  G. H. SMITH ET AL  2,146,273
PRESSURE REGULATING AND REDUCING APPARATUS
Filed Jan. 24, 1933  5 Sheets-Sheet 4
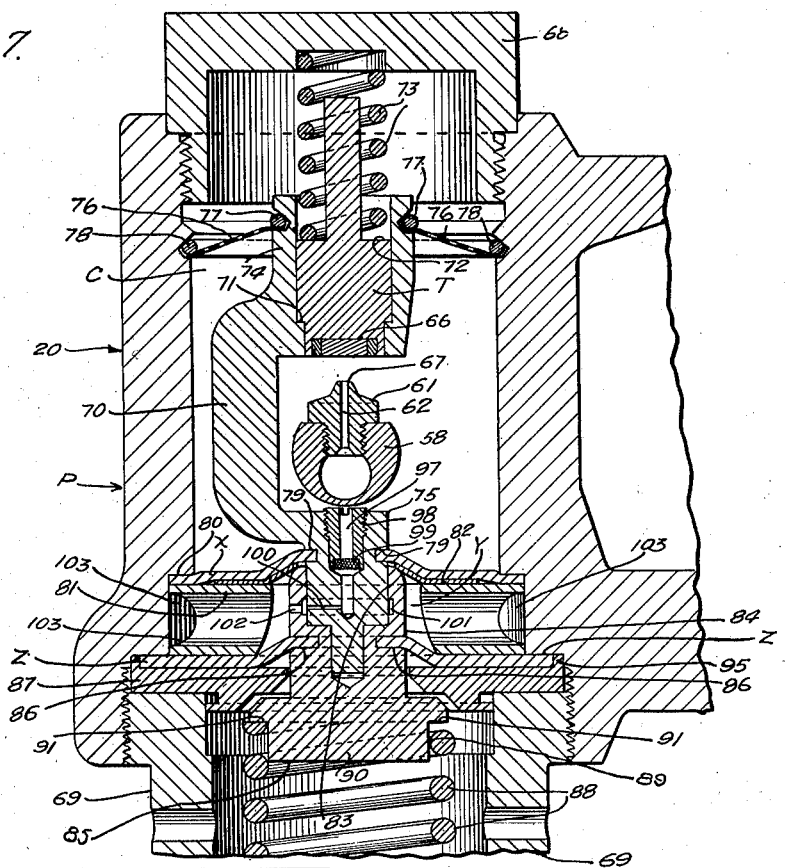
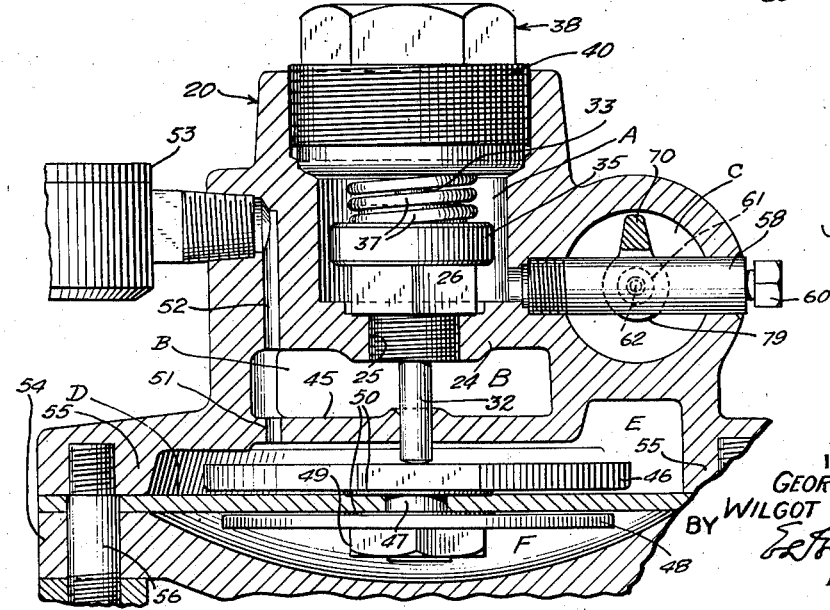
INVENTOR
GEORGE H. SMITH
WILGOT J. JACOBSSON
BY
ATTORNEY

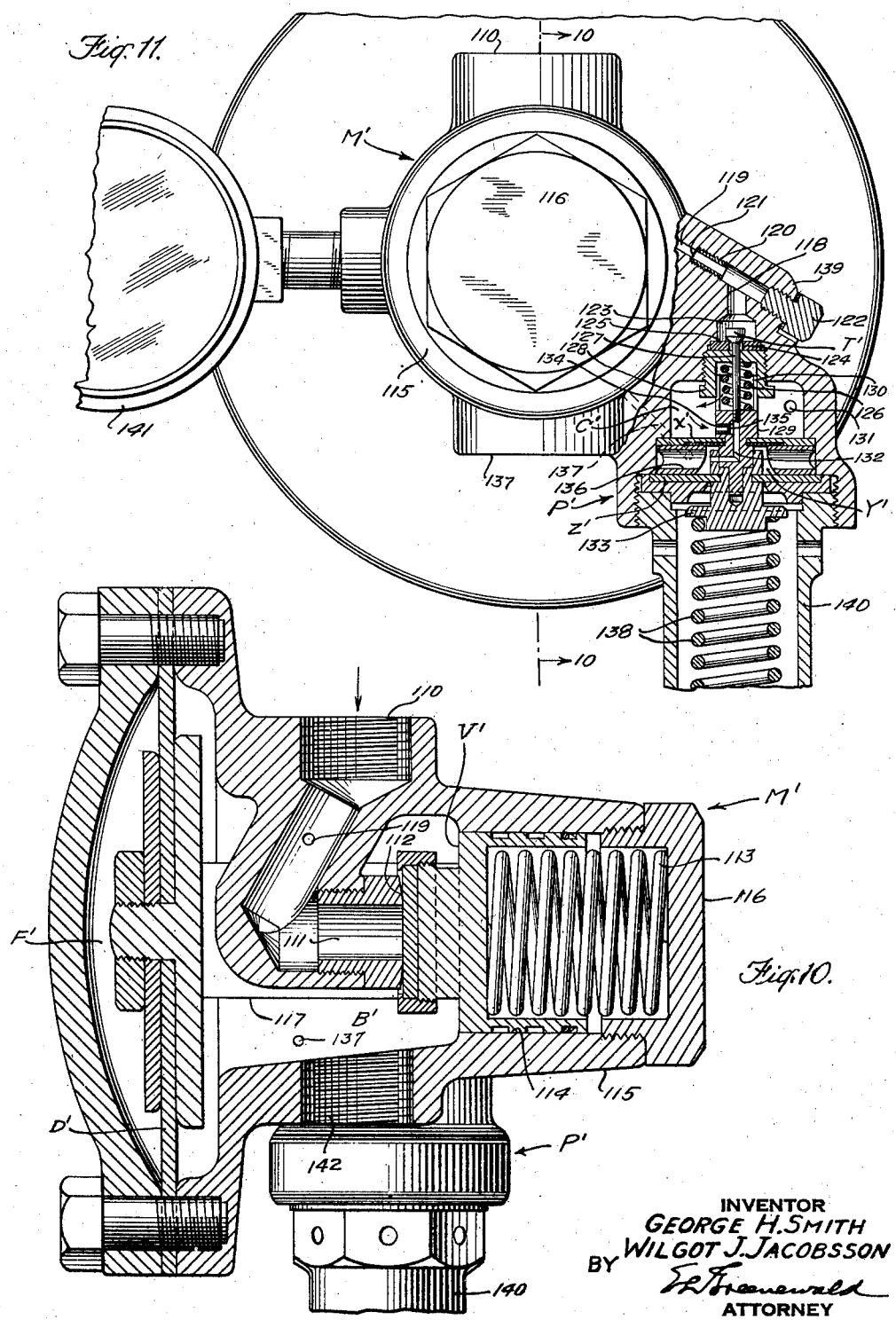

Patented Feb. 7, 1939

2,146,273

UNITED STATES PATENT OFFICE 2,146,273

PRESSURE REGULATING AND REDUCING APPARATUS

George H. Smith, Kenmore, and Wilgot J. Jacobsson, Buffalo, N. Y., assignors, by mesne assignments, to Union Carbide and Carbon Corporation, a corporation of New York Application January 24, 1933, Serial No. 653,242

17 Claims. (Cl. 50—11)

This invention relates to pressure regulating and reducing apparatus and more particularly relates to improvements in the type of apparatus having a pilot regulator adapted to control a main regulator for delivering a fluid at a substantially constant pressure.

In regulators where the effective force of the inlet pressure on the regulator valve is not constant or balanced the variation of the inlet pressure produces variations in outlet or delivery pressure of the regulator. Various types of balanced valves have been designed to eliminate variations in the delivery pressure resulting from variable inlet pressures on the regulator valve. Also two or more stages of pressure reductions have been used to gain this same end. The first of these expedients for eliminating the deleterious influence of variable inlet pressures has not proven entirely satisfactory, because balanced valves are more or less complicated and costly and they do not operate satisfactorily. The second of these expedients does not entirely eliminate the influence of variable inlet pressure on the delivery pressure but merely reduces the deleterious effects of the former, and furthermore each stage of pressure reduction makes the apparatus more cumbersome.

Referring particularly to regulators for use in the art of welding and cutting metals, it is very important to maintain constant delivery pressures for a given pressure setting over wide variations in gas consumption in order that more than one blowpipe may be supplied with gas from the same regulator and one or more of these blowpipes may be operated at the same time without substantially changing the desired quantity of gas available for consumption at any one of the blowpipes. Heretofore regulators having ample constant flow capacity have failed to respond quickly to the fluctuating demands for gas made upon them by the battery of blowpipes when one or more of the blowpipes were placed in or taken out of operation. When a sudden demand for a quantitative increase in the supply of gas delivered by the regulator was caused by placing additional blowpipes in operation the delivery pressure of the gas dropped and the blowpipes that may have previously been in operation were robbed of the necessary gas to complete the welding or cutting operation in which they were engaged. Although the capacity of the regulator may be sufficient to meet the increased demand for gas and to build the pressure back to normal after a short period, the momentary fluctuation of the gas pressure is sufficient however to cause a defective weld or cut and a loss of time.

The regulator delivery pressure or hose line pressure and volume of gas delivered must be varied to meet the requirements of different types of equipment and different types of welds and cuts of different thicknesses. In order that a single regulator may meet these requirements and satisfactorily supply a battery of blowpipes with gas it is necessary that the regulator be adjustable to deliver gas at a wide range of pressures, and that it be capable of quickly responding to sudden demands for increased quantitative delivery of gas without any substantial change in the delivery pressure.

Among the objects of this invention is to provide an apparatus for reducing a fluctuating supply pressure to any one of a number of selected lower delivery pressures and to maintain the delivery pressure substantially constant for any selected pressure while sudden and heavy flow demands are made upon the apparatus.

A further object of this invention is to construct the pressure regulating and reducing apparatus so as to be readily accessible for cleaning and repair.

The above and other objects and novel features of this invention will be apparent from the following description and accompanying drawings of which:

Fig. 1 is an elevation of a preferred form of pressure regulating and reducing apparatus shown in cross-section on line I—I in Fig. 2;

Fig. 2 is a view in elevation of the apparatus with a portion cut away to disclose the pilot regulator valve;

Fig. 3 is a view of the apparatus in cross-section on line 3—3 in Fig. 2;

Figs. 4 and 5 are fragmentary sections on lines 4—4 and 5—5 respectively in Fig. 2;

Fig. 6 is a view of the apparatus in cross-section on line 6—6 in Fig. 2 excepting the outlet pressure gauge, a fragment of which is shown;

Fig. 7 is an enlarged view of a portion of the apparatus in cross-section disclosing the pilot regulator with its valve in the wide open position;

Figs. 8 and 9 are respectively enlarged top and side views of the valve guide friction ring shown in section in Fig. 1;

Figs. 10 and 11 are views in elevation of a modified form of the invention in which Fig. 10 is a cross-sectional view on line 10—10 of Fig. 11 showing the main regulator valve adapted to open in the direction of the flow of the fluid; and Fig. 11 is a partly full and partly cross-sectional view disclosing the pilot regulator valve adapted to open in the opposite direction to that of the fluid flow.

Figs. 12 and 13 are cross-sectional views illustrating respectively alternative constructions of a Venturi tube and a reversed Pitot tube connection between the pilot and main regulator.

Referring to the drawings, a main regulator M is shown in Fig. 1 as assembled within a body 20 and a pilot regulator P which controls the main regulator is shown in Figs. 2 and 3. The body 20 may comprise a unitary casting or structure having a compartment for the operating mechanism for each of the regulators.

The main regulator M has an inlet chamber A in the body 20 of the apparatus which is adapted to be connected to a source of fluid pressure through a conduit 21 leading to the apparatus. At various points in the fluid passages screens are inserted to screen out particles of foreign matter. Such a screen 22 is placed in the entrance to the inlet chamber A, and is retained in place by a threaded ferrule 23. The main regulator M is provided with an outlet or delivery pressure chamber B which is separated from the inlet chamber A by a partition 24. The partition 24 has a bore 25 therethrough into which a nozzle 26 is threaded. The nozzle 26 has a port 27 which extends from the inlet A to the outlet B of the regulator M. The entrance to the nozzle port 27 is provided with a convex valve seat 28 adapted to insure a relatively narrow line of contact or sealing surface between the nozzle 26 and a valve disc 29 on the head 30 of a valve V which controls the port 27. The valve disc may be made of a suitable composition material held in close engagement with the metal of the valve head 30. The valve V is provided with a valve operating stem 32 extending from the side of the valve head 30, adjacent to the nozzle 26 and a guiding stem 33 extending from the opposite side of the valve head 30.

The valve operating stem 32 is provided with a groove 34 for gripping the edges of a central hole in the valve disc 29. The outer edge of the head 30 is threaded to receive a disc retaining ring 35 which has an annular lip bearing against the outer edge of the valve disc for holding it firmly against the head of the valve V. The side of the head 30 of the valve V facing away from the nozzle has a hub 36 projecting within and guiding a helical spring 37 which is compressed between the valve V and a cap 38. The spring 37 is preferably of low compressive strength, having a low spring constant. The term spring constant as used herein means the force required to deflect the spring a unit distance. When the cap 38 is tightly screwed into the wall of the body 20 by means of engaging threads 39, 40 on the body 20 and the cap 38, the spring 37 tends to keep the valve V in its closed position. A bore 41 in the cap allows the guiding stem 33 of the main valve to slide therein as the main valve V moves to control the opening of port 27. Near the end of the stem 33 a groove 42 may be provided for a friction ring 43 which is shown in detail in Figs. 8 and 9. The ring 43 is split so that it expands radially against the walls of the bore 41 in the cap 38 and the ring is also bent on a line across a diameter so that it fits closely within groove 42 and yet is free to turn about the valve stem. Chattering of the main regulator valve is substantially prevented by the small amount of friction produced by the ring 43 which slides frictionally in the bore 41.

A bore 44 is made in the wall 45 of the outlet chamber B in alignment with the valve port 27 and the bore 41 in the valve guiding cap 38. The operating stem 32 of the main valve V extends through the bore 44 and into an outlet or delivery pressure controlled chamber E formed between the walls of a depression in the body 20 of the apparatus and a main diaphragm D, which is adapted to operate the valve operating stem 32. The operating force is transmitted to the valve stem 32 through a diaphragm supporting plate 46 which contacts with the end of the valve stem 32. The supporting plate is clamped to the diaphragm D by means of a stud 47 which extends through a central opening of the diaphragm. The stud 47 passes through another plate 48 on the opposite side of the diaphragm which is urged towards the first supporting plate 46 by a nut 49 on the stud 47. The main diaphragm D is thereby clamped securely between central bosses 50 on the respective plates 46, 48 and leakage of fluid through the central opening in the diaphragm is thereby prevented.

As disclosed in Fig. 6 a bore 51 is made in the wall 45 between the outlet chamber B and the outlet controlled chamber E to provide a freely communicating passage between the chambers. A bore 52 in prolongation of the one between the chambers is made in the body 20 to which a pressure gauge is attached for indicating the outlet or main regulator delivery pressure.

A pilot controlled pressure chamber F is formed on the opposite side of the main diaphragm D from the outlet controlled pressure chamber E. The pilot controlled chamber F is formed between the main diaphragm D and a curved cover plate 54. The diaphragm D is clamped between the outer periphery of the cover plate 54 and a lip 55 on the body 20 by means of bolts 56 which pass through the cover plate 54 and which are threaded into the lip 55. The main diaphragm D when so positioned has an area exposed to the pilot controlled chamber F and an area exposed to the outlet controlled chamber E, and the differential of pressures acting upon the respective areas controls the position of the main valve V in respect to its valve seat 28 as will be more fully explained.

Fluid is supplied to the pilot controlled chamber F in the main regulator M by means of passages leading from the main regulator inlet chamber A to the pilot controlled chamber F. The passage of the fluid through the passages and the pressure of the fluid delivered to the chamber F is controlled by the pilot regulator P. The fluid on its passage from the inlet chamber A to the pilot controlled chamber F flows through a passage 57 in a nipple 58 which is screwed into a bore in the wall of the inlet chamber A. The nipple 58 passes through the pilot primary delivery chamber C and the opposite end of the nipple 58 is soldered or otherwise sealed in a bore in the opposite wall of the chamber C. The passage 57 in the nipple 58 is provided with a screen retainer 59 having a screen over the passage therethrough. The outer end of the passage 57 in the nipple 58 is closed with a plug 60. A nozzle 61 is secured to the nipple 58 and it is provided with a passage 62 for conducting the fluid from the nipple 58 to the pilot primary delivery chamber C. As shown in Fig. 4 the fluid then flows from the primary delivery chamber C to the pilot controlled chamber F through a passage 63 formed in the wall of the body 20, a nipple 64 inserted in a bore in the diaphragm D and a passage 65 in the cover 54 of the pilot controlled chamber F.

A pressure controlled pilot valve T is provided with a valve disc 66 which cooperates with a narrow valve seat 67 around the discharge end of the passage in the pilot valve nozzle 61 for controlling the passage of the gas therethrough. The mechanism for operating the pilot valve T is enclosed in the space between a closure cap 68 for one end of the chamber C and a diaphragm retaining and spring cap 69, one of which is screwed into an extension of each end of the chamber C. The pilot valve T may be of cylindrical shape fitting slidably within a valve stem or yoke 70 and may have a stop shoulder 71 cooperating with a similar shoulder on the yoke so that the yoke may move the disc 66 away from the nozzle 61. The valve T is further provided with a shoulder 72 against which a light valve-closing spring 73 is compressed, the fixed end of the spring being supported by a small recess in the cap 68.

The yoke 70 is U-shaped and has a valve disc guiding portion 74 at one end and a diaphragm-supporting portion 75 at the other end. The two end portions of the yoke 70 are in alignment with the nozzle 61 and are positioned on opposite sides of the nipple 58. When centrally positioned in the chamber C the upper end of the yoke is guided by an annular perforated metal disc 76 held at the inner periphery thereof by a shoulder on the yoke 70 and at the outer periphery by a shoulder in the wall of the chamber C. Wire clamping rings 77, 78 keep the disc flexibly positioned against the respective shoulders.

The diaphragm-supporting end 75 of the yoke 70 passes through a central opening in a primary diaphragm X which closes the lower end of the pilot primary delivery chamber C. The edge of the opening in the diaphragm X fits into a groove 79 in the yoke and forms a fluid tight seat therewith. The outside edge of the diaphragm X is clamped between a shoulder 80 in an extension of the wall of the chamber C and an annular spacer 81 having a central opening or secondary delivery chamber Y therein to receive the diaphragm supporting end 75 of the yoke 70. In order to strengthen the diaphragm X a thin flexible metal disc 82 smaller than the chamber C and fitting loosely around the lower end 75 of the yoke 70 is inserted between the spacer 81 and the diaphragm X.

The diaphragm supporting end 75 of the yoke 70 slidably fits into a bore 83 in the stem 84 of a diaphragm supporting and guiding washer 85 and may be supported by the bottom of the bore. The stem 84 of the washer 85 passes through a central opening in a secondary diaphragm Z which closes the lower end of the secondary delivery chamber Y formed in the central opening of the spacer 81 between the primary and secondary diaphragms X, Z. A groove 86 is formed in the stem of the washer 85 and the edge of the central opening in the secondary diaphragm Z fits into the groove and thereby forms a fluid tight seal between the diaphragm Z and the stem 84. The secondary diaphragm Z is received in a recess in a diaphragm supporting and guiding disc 87 having a central opening therein through which the stem 84 of washer 85 is inserted before the secondary diaphragm Z is placed thereon.

It should be noted at this point that the central opening in the diaphragm spacer 81 is smaller at the end adjacent to the primary diaphragm X than it is at the end adjacent to the secondary diaphragm Z and as a result the effective area of the bottom of the primary diaphragm which is exposed to the opening or secondary delivery chamber Y is less than the effective area of the secondary diaphragm Z which is exposed to the same chamber. Therefore any fluid pressure which may be transmitted to the secondary delivery chamber Y will exert a preponderance of force on the secondary diaphragm, which force acts additively with the force exerted by the fluid pressure in the primary delivery chamber C on top of the primary diaphragm X. The combination of these forces acts unitarily through the diaphragm guiding washer 85 to overcome the force of an adjusting spring 88 acting in compression against the head 89 of the washer 85 and will thereby permit the pilot valve closing spring 73 to move the pilot valve T from its open position as shown in Fig. 7 to its closed position as shown in Figs. 2 and 3. Both the primary and secondary diaphragms are made of very flexible materials such as rubber. For reasons to be further explained the apparatus is so constructed that when it is in operation under fluid pressure, the pressure per square inch on top of the primary diaphragm is never less than the pressure per square inch on the bottom of the primary diaphragm. Also when fluid is being admitted through the open pilot valve port 62 the pressure per square inch in the primary diaphragm chamber C is greater than the pressure in the secondary diaphragm chamber Y. For these reasons that portion of the primary diaphragm X lying on the spacer 81 between the central opening Y and the walls of the primary delivery chamber C will always be forced in contact with the entire top surface of the spacer 81 and a constant effective area of the bottom of the primary diaphragm will be exposed to the secondary diaphragm chamber Y during the operation of the apparatus under pressure.

The head 89 of the diaphragm supporting washer 85 is provided with a hub 90 which fits into one end of the adjustable coil spring 88. The hub 90 centers and retains the spring 88 on the head 89 of the washer 85. The spring 88 is normally compressed between an annular shoulder 91 on the diaphragm guiding washer head 89 and a shoulder 92 on a cup-shaped washer 93 supported by the end of an adjusting screw 94 which cooperates with threads in a bore in the lower end of the spring cap 69. The spring cap 69 is screwed into the bottom end of the extension of the chamber C. The inner end of the spring cap 69 is screwed up against the secondary diaphragm supporting disc 87 and clamps the disc and the secondary diaphragm Z between the end of the spring cap 69 and a shoulder 95 in the walls of the lower extension of the chamber C. When the chamber closure cap 68 and the spring cap 69 are in place, the pilot valve mechanism is maintained in its operating position and it may be manually adjusted by screwing the adjusting screw 94 in or out by means of a screw handle 96. When the pilot adjusting screw 94 is set for operating of the main regulator M, the compressive force of the adjusting spring 88 and the inlet pressure acting on the pilot valve T maintains it in an open position, as shown in Fig. 7, except when the composite pressure on the pilot primary and secondary diaphragms is high enough to close the valve as shown in Figs. 2 and 3.

Fluid may flow from the primary delivery chamber C to the secondary delivery chamber Y through a constricted bleeder passage 97 in the pilot valve yoke 70. A plug 98 having a screen 99 secured in its end is screwed into the inlet to the bleeder passage 97. The discharge end 100 of the bleeder passage in the yoke 70 is reduced in size to provide the constriction therein. It is drilled at right angles to the inlet to the passage, and it discharges into an annular groove 101 within the bore 83 in the diaphragm guiding washer 85, within which the diaphragm supporting end 75 of the yoke 70 is slidably fitted. The groove 101 in the washer 85 is made sufficiently wide to obtain communication between the bleeder passage 97 and the groove 101. A tap hole 102 extends through the wall of the washer stem 84 into the groove 101 to conduct fluid from the groove 101 into the secondary delivery chamber Y.

The spacer 81 which separates the pilot primary and secondary diaphragms X, Z has a circumferential groove 103 formed in its outer periphery which is connected to the secondary delivery chamber Y by means of a plurality of radial passages 104 formed in the spacer 81. The chamber formed between the walls of the groove 103 in the spacer and the walls of the recess which retain the spacer is connected with the main regulator delivery chamber B by a passage 105 in the body 20 of the apparatus as shown in Fig. 5. The latter passage 105 completes the connecting link between the pilot controlled main diaphragm chamber F and the delivery chamber B through the pilot primary and secondary delivery chambers C, Y.

It will be noted that the connections between the pilot primary delivery chamber C and the pilot controlled main diaphragm chamber F have no effective constrictions and in like manner the connections between the pilot secondary delivery chamber Y and the main regulator delivery chamber B have no effective constrictions, but there is a constriction 100 between the pilot primary diaphragm chamber C and the pilot secondary diaphragm chamber Y. Due to the non-constricted passages substantially the same pressure is maintained in the primary diaphragm chamber C and the pilot controlled main diaphragm chamber F and substantially the same pressure is maintained in the secondary diaphragm chamber Y and the delivery pressure controlled main diaphragm chamber E but due to the constriction 100 in the bleeder passage 97 a differential of pressure may be maintained between the primary and secondary delivery chambers C, Y. This differential of pressure is herein called an intermediate pressure. The pressure in the two chambers C, Y tends to become slowly equalized at all times through the passage of fluid through the bleeder passage 97 and it does become equalized under certain conditions to be referred to hereinafter.

To place the apparatus in operation the pilot valve adjusting screw 94 is set in its outward position, as shown in Fig. 3, so that the pilot valve closing spring 73 will seat the pilot valve T and prevent the fluid in the chamber A from entering the primary delivery chamber B and disrupting the diaphragm D when the fluid under pressure is admitted to the main inlet chamber A from a source of supply. Having connected the apparatus to a source of fluid under pressure and the outlet from the main regulator delivery chamber being closed, the apparatus operates as follows:

Fluid entering through the conduit 21 passes through the screen 22 into the inlet chamber A and flows from the chamber A through the nipple 58 and pilot valve nozzle 61 to the pilot valve T. The fluid is prevented from passing through the ports 27, 62 in respectively the main and pilot valve nozzles 26, 61 by their respective valves V, T which are retained in their closed positions by their respective valve spring 37, 73.

The pilot spring adjusting screw 94 is then screwed in to compress the adjusting spring 88 and force the pilot regulating valve T away from the valve seat 67. The fluid then flows into the pilot primary chamber C and builds up a pressure therein which is freely transmitted through the passage 63 in the apparatus body 20 to the pilot controlled main diaphragm chamber F. At the same time a small amount of the fluid is by-passed from the main inlet A to the main outlet B. The by-passed fluid flows from the primary chamber C to the secondary chamber Y through the constricted bleeder passage 97 in the yoke 70. The fluid pressure in the pilot controlled main diaphragm chamber F acts on the main diaphragm D to open the main regulator valve V, and the equal pressure in the pilot primary chamber C and the lesser pressure in the secondary chamber Y act on their respective diaphragms to close the pilot valve T against the pressure of the inlet fluid on the pilot valve and the force of the pilot adjusting spring 88. The adjusting screw 94 is screwed in sufficiently to resist the forces tending to close the pilot valve T and to maintain the pilot valve T in an open position until sufficient pressure has been built up in the chambers C, and F to open the main regulator valve V and allow the fluid to pass through the main valve port 27 to the main delivery chamber B. When the desired delivery pressure is registered on the delivery pressure gauge 53, the pilot adjusting screw 94 is in proper adjustment.

The moment the main regulator valve V opens, the pressure in delivery chamber B is increased. This pressure is freely transmitted to the delivery controlled main diaphragm chamber E where it acts on the delivery side of the main diaphragm D to move the diaphragm away from the main valve seat 28, permitting the main valve V to close under the action of the main valve spring 37. The pressure in the main delivery chamber B is also transmitted to the pilot secondary chamber Y through the passage 105 in the body of the apparatus. As the effective area of the secondary diaphragm Z is larger than the effective area of the primary diaphragm X, the pressure in the pilot secondary chamber Y will act with the pressure in the primary diaphragm chamber C to close the pilot valve T. Normally the additional force of the main regulator delivery chamber pressure acting on the pilot secondary diaphragm Z causes the pilot valve T to close. Both the main and pilot valves V, T close substantially at the same time, when the pressure in the delivery chamber B reaches the point determined by the setting of the adjusting screw 94.

Preferably the effective areas of the pilot side and the main delivery side of the main diaphragm D are made equal. Where the effective areas of each side of the main diaphragm D are equal as illustrated the pressure per square inch on the pilot side F of the diaphragm D is always greater than the pressure per square inch on the delivery side E thereof when the main valve V is open and for a short period after the main valve has closed. The excess pressure in the pilot controlled main diaphragm chamber F is required to overcome the force of the main inlet pressure and the force of the main valve closing spring 37 which act to close the valve V. After the main and pilot valves have closed, the pressure per square inch on each side of the main diaphragm D is equalized by the passage of fluid from the pilot primary chamber C to the pilot secondary chamber Y through the constricted bleeder passage 97 in the pilot valve yoke 70. The equalization of these pressures does not effectively increase the pressure in the delivery chamber B, but it does substantially lower the pressure in the primary chamber C as the volume of gas in the main delivery chamber B and the hose or pipe lines connected therewith is many times greater than the volume of the gas in the pilot primary chamber C, and the connecting pilot controlled main diaphragm chamber F. The equalization of the pressure on the opposite sides of the main diaphragm D is beneficial, as the full force of the main valve spring 37 and the differential of pressure between the inlet and delivery pressures on the main valve V are unopposed in their combined action to seat the valve V tightly on its seat and thereby prevent leakage by the main valve V, and prevent an excessive rise in the main delivery pressure.

By equalizing the pressure on both sides of the primary diaphragm X, the forces acting to close the pilot valve T are more nearly balanced against the forces acting to open the pilot valve T, but there remains a preponderance of force acting to close the valve which is great enough to seal the pilot valve port 62.

Due to the equalization of pressure on both sides of both diaphragms D, X the main valve V is caused to seat more firmly, while the pilot valve T is caused to seat, but less firmly, and to become more sensitive. Under this condition when the flow from the delivery chamber B of the main regulator M is started, as by the opening of one or more blowpipe valves, (not shown) the very slight drop of pressure in the delivery side of the main diaphragm D produced by the gas flow will not directly cause the main valve V to open, but the pilot regulator being very sensitive, it will instantly respond to the very slight drop in pressure and act upon the main regulator and cause it to allow flow of gas equal to that flowing from the chamber B to pass through main port 27 and thereby build up and maintain the delivery pressure at the point predetermined by the setting of the pilot adjusting screw 94.

Assuming that the fluid pressure in the main inlet A remains constant, the degree of port opening of the main valve V will be constant for a given fluid flow from the delivery chamber B, and if the flow rate varies, the degree of port opening will be instantly adjusted in direct proportion to the rate of flow within the limits of the flow capacity of the apparatus, which capacity varies directly with the inlet pressure and inversely with the delivery pressure. The adjustment of the main valve to quantity of flow of fluid is caused by the fact that an increased flow demand at the outlet from B tends to lower the delivery pressure, which in turn lessens the force of the delivery pressure acting on the pilot secondary diaphragm, which in turn allows the further opening of the pilot valve T, which in turn allows a greater pressure to accumulate in the pilot controlled main diaphragm chamber F, which in turn adjusts and maintains the main valve V in its new wider open position to build up the slight drop in pressure in the main delivery chamber B and maintain the increased flow from the delivery chamber B by allowing a quantity of fluid to flow thereinto from the inlet chamber A which is equal to the quantity flowing from the chamber B. The apparatus operates in the reverse order when the flow from the main regulator outlet or delivery chamber decreases and causes a slight rise in pressure in the chamber.

In order to obtain a greater pressure drop in the pilot secondary delivery chamber Y for a given fluid flow from the outlet chamber B than is obtained by the construction shown in Fig. 5, a Venturi tube 106 may be inserted in the outlet line from the main delivery chamber B and the passage 105 leading from the secondary chamber Y may be terminated in the throat 107 of the Venturi tube as shown in Fig. 12 instead of in the outlet chamber B as shown in Fig. 5. Likewise the passage 105 leading from the secondary chamber Y may terminate in a reversed Pitot tube 108 placed in the line leading from the outlet chamber B, as shown in Fig. 13 to obtain a similar drop in pressure in the pilot secondary chamber Y. It is preferable to place the end of the Pitot tube in the throat of a Venturi tube as shown in Fig. 13, but where the reversed Pitot tube is used it may be inserted in a straight walled conduit and the Venturi tube may be eliminated. The structure shown in Figs. 12 and 13 causes the pilot secondary diaphragm to respond with greater sensitiveness to variation in fluid pressure in the main outlet B.

In order to obtain a given delivery pressure with a given constant orifice opening, such as with a maximum valve port opening, a minimum pressure differential between the inlet pressure and the delivery pressure is required. In regulators where the inlet pressure exerts a force upon the valve and tends to open or close the valve, a variation in the inlet pressure changes the force exerted upon the valve and causes a variation in the delivery pressure regardless of the pressure differential unless some means is provided to counteract the influence of the change in the inlet pressure. In order to counteract the variable influence of variable inlet pressures when the minimum, or greater than minimum, pressure differential is maintained, the main regulator valve V and the pilot valve T are made to open in opposite directions in respect to the flow of the fluid through their respective valve ports 27, 62 and the areas enclosed within the boundaries of the valve seats and the effective areas of the diaphragms D and X in the main and pilot regulators should be related to each other in accordance with the following equation:

$$\frac{Amn}{Am} = \frac{Aan}{Aa + Aan}$$

in which, $Amn$ = area enclosed within the boundary of the main valve seat, being herein termed the effective main valve area.

$Am$ = area of the main diaphragm D responsive to the pilot delivery pressure in the pilot primary chamber, being herein termed the effective area of the main diaphragm.

$Aan$ = area enclosed within the boundary of the pilot valve seat, being herein termed the effective area of the pilot valve.

$Aa$ = area of the pilot primary diaphragm X responsive to the pressure in the pilot primary chamber, herein termed the effective area of the pilot primary diaphragm.

In the above equation if $Aan$ is small as compared to A$a$ the equation may be written as follows without any appreciable error and the apparatus may be designed accordingly:

$$\frac{Amn}{Am} = \frac{Aan}{Aa}$$

Therefore in the accompanying claims the expression "effective area of the diaphragm associated therewith," and similar expressions, are intended to designate the areas of the responsive diaphragms responsive to the pressure in the outlet chamber of the pilot valve.

In piolt controlled regulators of the type shown where the inlet pressure exerts a closing force upon one of the regulator valves and an opening force upon the other regulator valve, the delivery pressure controlled by the valve upon which the closing force is exerted rises as the inlet pressure falls, and the delivery pressure controlled by the other valve falls with the falling inlet pressure. In such a case the regulator having the valve upon which the inlet pressure exerts a closing force is said to have a rising characteristic and the other regulator is said to have a falling characteristic. If the ratios between the effective valve areas and the effective diaphragm areas in each regulator are made substantially equal to each other in accordance with the foregoing formula the rising characteristic of one valve will be balanced by the falling characteristic of the other and the delivery pressure of the main regulator will be substantially constant irrespective of a change in inlet pressure.

Thus, for example, with the arrangement of apparatus parts shown in Figures 1 to 5, the selected lower pressure of the fluid in the main outlet tends to vary inversely with changes in the initial fluid pressure at the inlet, and such variations occur within a narrow pressure range which approaches zero as the ratio of the effective seating area of each valve to the effective area of the diaphragm associated therewith approaches equality. Concurrently, the intermediate pressure of the fluid in the pilot chamber C varies directly with changes in the initial fluid pressure at the inlet, which variations occur also within a narrow range which approaches zero as the above-mentioned ratio approaches equality. By opposing in the main diaphragm chamber the said intermediate pressure and the "selected lower" pressure, which tend to vary slightly, the opposing pressure increments due to the variations in the inlet pressure substantially offset each other in the main diaphragm chamber, and the main valve therefore continues to be actuated by the same forces that control it when no inlet pressure variations occur.

The regulator is preferably constructed so that the area of the main diaphragm D which is responsive to pressure in the main delivery chamber B is equal to the area of the main diaphragm responsive to the pressure in the pilot controlled chamber F, but the respective areas may be unequal and differential diaphragms may be used if desired.

The best results are obtained when the spring constants of the valve operating springs 37, 73, 88 used in both the main and pilot regulators M, P are made as small as practicable.

Under a given set of conditions the spring constants of the respective valve springs will vary in accordance with the size of the main and pilot valves V and T and also in accordance with the direction of the opening movements in respect to the flow of the fluid through the respective valve seats 28, 67. If the opening movement of the valve is in the opposite direction to the flow, the spring constant for the corresponding valve spring will be less than when the opening movement of the valve is in the same direction as the flow. In accordance with one feature of the invention the main and the pilot valves open, one in the same direction as the flow and the other in the opposite direction to the flow. Consequently the benefit of the minimum spring constant that can be obtained when the valve opens against the flow of the fluid cannot be obtained in both of the valves in the same apparatus, but since the main regulator valve V is larger than the pilot regulator valve T, the total of the spring constants can be kept at a minimum when the main regulator opens against the inlet pressure. Therefore it is preferable to arrange the main valve V so that it opens in the direction opposite to the fluid flow as described in reference to the modification of the invention shown in Figs. 1 to 7.

However the main regulator valve may be made to open in the same direction as the fluid flow while in the same apparatus the pilot regulator valve is made to open in the direction opposite to the fluid flow. A modification of the invention disclosing the main and pilot valves operating in such a manner is shown in Figs. 10 and 11 which will now be described.

As the apparatus disclosed in Figs. 10 and 11 is similar to the apparatus disclosed in Figs. 1 to 7 the modification disclosed in Figs. 10 and 11 will not be described in detail except in reference to features in which the two modifications differ. In Fig. 11 the main regulator M' is shown in full elevation and portions of the apparatus are broken away disclosing the pilot regulator P' in cross-section and in Fig. 10 the main regulator M' is disclosed in cross-section on the line 10—10, Fig. 11. In this modification the apparatus may be adjusted to deliver different pressures by means of a pilot valve adjusting screw (not shown) similar to that shown in reference to Figs. 1 to 7. When the apparatus is connected to a source of fluid under a suitable pressure, the fluid enters the main inlet 110 and impinges against the main valve V' which closes the main valve port 111. The main valve V' is urged against a valve seat 112 by a spring 113, which exerts a greater force on the valve V' to close the valve than is exerted by the maximum differential of pressure between the inlet and delivery pressures which tends to open the valve V'. The valve V' is guided in a bore 114 in the body 115 of the main regulator M'. The valve closing spring 113 is located in the bore 114 and is compressed between the valve V' and a valve cap 116 screwed into the bore 114.

A diaphragm D' in the main regulator M' is provided to control the opening and closing action of the valve V'. The diaphragm D' is connected to the valve V' by a yoke 117 and its movement is controlled by the respective fluid pressures in the delivery chamber B' and the pilot controlled chamber F'.

Fluid is admitted to the pilot controlled chamber F' through the pilot regulator P'. The inlet 118 to the pilot regulator P' is connected to the inlet 110 to main regulator M' by a bore 119 extending between the two inlets 118, 110. A hollow plug 120 having a screen 121 therein is positioned in the bore 119, and the bore is closed at its outer end by a plug 122 threaded into the bore. The flow of fluid from the pilot inlet chamber 123 to pilot primary delivery chamber C' is controlled by a valve T' adapted to be seated in the port 124 which extends between the two chambers. The valve T' in this case opens against the inlet pressure and is urged against its seat 125 by a relatively light spring 126. The spring 126 encircles the valve stem 127, and it is compressed between a valve seat retaining plug 128 and a valve guide 129 to which the valve stem 127 is connected. The valve guide 129 comprises a cage 130, which retains the valve spring 126 therein and provides a passage from the valve port 124 to the primary delivery chamber C' into which the fluid may pass between the cage members and the lower end of the valve seat retaining plug 128 as indicated by the arrow. A passage 131 connects the primary diaphragm chamber C' to the pilot controlled chamber F' in the main regulator in a manner similar to that shown in Fig. 4 relating to the previously described modification.

The primary delivery chamber C' is connected to the secondary delivery chamber Y' by a U-shaped bleeder passage 132 in the lower end of the valve guide 129 and through the wall of the recess in the diaphragm guide 133 which retains and supports the valve stem guide 129. A hollow plug 134 having a screen 135 attached thereto over the passage through the plug 134 is secured in the entrance to the U-shaped passage 132.

The secondary delivery chamber Y' is connected to the main delivery chamber B' in the main regulator M' through the diaphragm spacer 136 by a passage 137 in the body 115 of the apparatus similarly as shown in Fig. 5 which relates to modification previously described.

The lower portion of the pilot valve operating mechanism comprising the diaphragms X', Z', the diaphragm spacer 136, the diaphragm guide 133, and valve adjusting spring 138 is retained in the lower portion of the pilot regulator body 139 by means of a spring cover 140.

A pressure gauge 141 is connected to the delivery chamber B' in a manner shown in Figs. 2 and 6. When the apparatus is connected for operation, the pressure in the delivery chamber B, as indicated by the pressure gauge 141, may be adjusted by means of a pilot adjusting screw (not shown), when fluid is discharged from the main outlet 142, and the apparatus will operate in the manner previously described in reference to the other modification.

While the preferred form of the invention and a modification thereof have been shown herein, other changes may be made in the invention without departing from the scope of the appended claims.

We claim:

1. A pressure regulating and reducing apparatus comprising the combination of a main regulator and a pilot regulator; said main regulator having an inlet and an outlet; a main valve and a valve seat therefor for controlling the flow of fluid from said inlet to said outlet; a fluid pressure responsive device for operating said main valve in response to a pressure controlled by said pilot regulator; said pilot regulator having an inlet and a delivery chamber; a pilot valve opening with inlet pressure, and a valve seat therefor for controlling the communication between said inlet and said delivery chamber; a conduit leading from said pilot delivery chamber to said main pressure responsive device; a second fluid pressure responsive device operated in response to said pilot delivery pressure for actuating said pilot valve; said main and pilot valves being subject to the force of the same inlet pressure which tends to move said valves in reference to their seats; and means for compensating for changes in the force of the inlet pressure acting on said valves, the respective valves being so arranged that they open in opposite directions in respect to fluid flow therethrough, the ratio between the effective seating area of each valve and the effective area of the fluid pressure-responsive device associated therewith directly acted upon by pressure in the pilot delivery chamber being substantially equal.

2. In a pressure regulating and reducing apparatus the combination of a main regulator and a pilot regulator for supplying a controlling pressure to operate the main regulator; the main regulator having a valve and a valve seat, said valve opening against inlet pressure; the pilot regulator having a valve and a valve seat, said valve opening with inlet pressure; each of said regulators having a resilient means constantly acting to close said valves and a fluid-pressure actuated diaphragm directly attached thereto and adapted to open and close said valves, each of said diaphragms being operated in response to the pilot delivery pressure and to the main regulator delivery pressure; and the ratio of the effective area of the valve to the effective area of the diaphragm in each regulator being equal for both regulators.

3. A pressure regulating and reducing apparatus comprising in combination a main regulator and a pilot regulator, said main regulator having an inlet and an outlet; a pilot delivery chamber being connected with the inlet and having a pilot valve having opposed resilient members and interconnected spaced pilot diaphragms controlling the entrance to said pilot chamber; a main spring-pressed regulating valve and a valve seat therefor between said inlet and outlet, said valve being subject to the force of the inlet pressure which tends to move said valve in reference to its seat; a main diaphragm bearing against but unconnected with the main valve; a space adjacent the main valve in which said main diaphragm works, said space being connected with the pilot delivery chamber; means associated with said pilot regulator and said main regulator for counteracting the influence of variations in the inlet pressure on the main regulating valve; and means including an adjustable spring for varying the position of the pilot valve and the pressure delivered to the main diaphragm space.

4. A pressure regulating and reducing apparatus comprising a unitary structure having an inlet and an outlet; a main valve between said inlet and outlet and closing with pressure of inlet gas; a by-pass around said main valve connecting the inlet and outlet; a pilot valve controlling said by-pass, opening with pressure of inlet gas and delivering an intermediate pressure; a restriction in the passage following the pilot valve; fluid-responsive means for operating the main valve under action of the intermediate pressure; fluid-responsive means controlling the pilot valve and quickly operative under both the action of the said intermediate pressure and of the main valve outlet pressure; and means including a diaphragm under pressure of an adjustable spring for controlling the pilot valve in accord with rapid changes in the rate of consumption of gas supplied by the apparatus, the ratio of the effective valve seating area of the main valve to the effective area of the associated diaphragm responsive to pilot delivery pressure being substantially equal to the ratio of the effective valve seating area of the pilot valve to the effective area of the diaphragm associated with the latter and directly responsive to pilot delivery pressure.

5. A pressure regulating and reducing apparatus comprising a main regulator and a pilot regulator for supplying an intermediate pressure to operate the main regulator; a pilot valve for controlling said intermediate pressure; and a diaphragm responsive to said intermediate pressure for closing said valve; said pilot valve being adapted to open with the inlet pressure whereby the pilot regulator develops a falling pilot delivery pressure with a decrease in inlet pressure; said main regulator having a valve and a diaphragm adapted to open said main valve against the inlet pressure; said main diaphragm being acted upon by the action of the falling pilot delivery pressure to open said main valve; the ratio of the effective valve area to the effective diaphragm area in each of said regulators being equal so that the delivery pressure developed by the main regulator remains constant; and pressure responsive means connected with said pilot valve for quickly compensating for changes in the rate of consumption of gas supplied by the apparatus.

6. A pressure regulating and reducing apparatus comprising a structure having an inlet and an outlet; a main spring-pressed valve between the inlet and outlet; a by-pass leading around said main valve and connecting the inlet and outlet; a spring-pressed pilot valve controlling said by-pass and delivering an intermediate pressure; a restriction in the by-pass following said pilot valve; means including a diaphragm for operating said main valve by action of said intermediate pressure delivered by said pilot valve; means including a fluid-pressure responsive diaphragm for actuating the pilot valve by the same intermediate pressure; and an adjustable spring for setting the pilot valve for the delivery of required pressures, the ratio of the effective valve seating area of the pilot valve to the effective area of the associated diaphragm responsive to pilot delivery pressure being the same as the ratio of the effective valve seating area of the main valve to the effective area of the diaphragm associated with the latter and responsive to pilot delivery pressure.

7. In a pressure regulating and reducing apparatus having a pilot regulator and a main regulator each provided with an inlet and an outlet; a pilot regulator valve for supplying an intermediate pressure to operate the main regulator; a primary diaphragm connected with said pilot valve and adapted to press said pilot valve toward its closed position in response to the force of said intermediate pressure; a secondary diaphragm also connected with said pilot valve and adapted to cooperate with said primary diaphragm to close said pilot valve in response to increase in delivery pressure at the main regulator outlet; and means for adjusting the setting of the pilot valve to deliver said required intermediate pressure.

8. A pressure regulating and reducing apparatus comprising in a unitary structure the combination of a main regulator and a pilot regulator; said main regulator having an inlet and an outlet; a main valve and a valve seat therefor for controlling the flow of fluid from said inlet to said outlet; a fluid pressure responsive device for operating said main valve in response to a pressure controlled by said pilot regulator; said pilot regulator having an inlet and a delivery chamber; a pilot valve and a valve seat therefor for controlling the communication between said pilot inlet and said delivery chamber; a conduit leading from said pilot delivery chamber to said main pressure responsive device; a fluid pressure responsive device operated in response to said pilot delivery pressure for actuating said pilot valve; and a second pressure responsive device acting additively with respect to said first pressure responsive device for actuating said pilot valve, said second pressure responsive device being responsive continuously to the flow of fluid from said main outlet.

9. A pressure regulating and reducing apparatus comprising the combination of a main regulator and a pilot regulator; said main regulator having an inlet and an outlet; a main valve and a valve seat therefor for controlling the flow of fluid from said inlet to said outlet; a fluid pressure responsive device for operating said main valve in response to a pressure controlled by said pilot regulator; said pilot regulator having an inlet and a delivery chamber; a pilot valve and a valve seat therefor for controlling the communication between said pilot inlet and said delivery chamber; a conduit leading from said pilot delivery chamber to said main pressure responsive device; a fluid pressure responsive device operated in response to said pilot delivery pressure for actuating said pilot valve; and a second pressure responsive device acting additively with respect to said first pressure responsive device for controlling said pilot valve, said second pressure responsive device being responsive to the flow of fluid from said main outlet; and means bypassing the main regulator constantly acting to equalize the pressure in said pilot delivery chamber, said pilot secondary pressure responsive device and said main outlet.

10. A pressure regulating and reducing apparatus comprising the combination of a main regulator and a pilot regulator; said main regulator having an inlet and an outlet; a main valve and a valve seat therefor for controlling the flow of fluid from said inlet to said outlet; a fluid pressure responsive device for operating said main valve in response to a pressure controlled by said pilot regulator; said pilot regulator having an inlet and a delivery chamber, a pilot valve and a valve seat therefor for controlling the communication between said pilot inlet and said delivery chamber; a conduit leading from said pilot delivery chamber to said main pressure responsive device; a fluid pressure responsive device operated in response to said pilot delivery pressure for actuating said pilot valve; a second pressure responsive device acting additively with respect to said first pressure responsive device for controlling said pilot valve; a Venturi tube inserted in the said main regulator outlet; and a conduit leading from said second pressure responsive device to the throat of said Venturi tube.

11. A pressure regulating and reducing apparatus comprising the combination of a main regulator and a pilot regulator; said main regulator having an inlet and an outlet; a main valve and a valve seat therefor for controlling the flow of fluid from said inlet to said outlet; a fluid pressure responsive device for operating said main valve in response to a pressure controlled by said pilot regulator; said pilot regulator having an inlet and a delivery chamber; a pilot valve and a valve seat therefor for controlling the communication between said pilot inlet and said delivery chamber; a conduit leading from said pilot delivery chamber to said main pressure responsive device; a fluid pressure responsive device operated in response to said pilot delivery pressure for actuating said pilot valve; a second pressure responsive device acting additively with respect to said first pressure responsive device for actuating said pilot valve; and a conduit connecting said second pressure responsive device to a reversed Pitot tube in the outlet leading from said main regulator.

12. Pressure regulating and reducing apparatus comprising, in combination, a main regulator and a pilot regulator; the main regulator having a passage therethrough comprising an inlet and outlet portion; a main valve in control of the flow of fluid from said inlet to said outlet portion; the pilot regulator having a delivery chamber in communication with said inlet portion and a pilot valve in control of fluid flow therebetween; pressure responsive means operatively connected with the main valve and under influence of pressure from both said delivery chamber and said outlet portion for operating the main valve; and a second pressure responsive device connected with the pilot valve and under influence of the pressure from the delivery chamber in control of the pilot valve.

13. Pressure regulating and reducing apparatus comprising, in combination, a main regulator and a pilot regulator; the main regulator having a passage therethrough comprising an inlet and outlet portion; a main valve in control of the flow of fluid from said inlet to said outlet portion; the pilot regulator having a delivery chamber in communication with said inlet portion and a pilot valve in control of fluid flow therebetween; pressure responsive means operatively connected with the main valve and under influence of pressure from both said delivery chamber and said outlet portion for operating the main valve; and a second pressure responsive device adapted to function under influence of the pressure from the delivery chamber to actuate the pilot valve; the respective effective area ratios of the main valve to the main pressure responsive device and of the pilot valve to the second pressure responsive device being equal.

14. In a pressure regulating and reducing apparatus having a pilot regulator and a main regulator each provided with an inlet and an outlet, a pilot regulating valve for supplying an intermediate pressure to operate the main regulator; a primary diaphragm connected with said pilot valve and tending to close said valve under the force of the intermediate pressure; a secondary diaphragm having a slightly larger pressure responsive area than the pressure responsive area of the primary diaphragm and spaced therefrom, said secondary diaphragm also being connected with said pilot valve and acting additively with said primary diaphragm to close said pilot valve in response to the force of pressure at the main regulator outlet, and means connecting the space between the said primary and secondary diaphragms with the main regulator outlet.

15. A pressure regulating and reducing apparatus comprising in combination, a main regulator and a pilot regulator, each having an inlet and an outlet and having a valve interposed between the said inlet and outlet, one of the said regulating valves opening with inlet pressure and the other thereof opening against inlet pressure, a main fluid pressure-responsive device for operating said main valve, means operatively connecting the said device with the pilot regulator outlet, means having therein a constricted passage connecting the pilot regulator outlet with the main regulator outlet, the last-named means including a chamber having opposite walls formed by two opposed diaphragms of different sizes, the said chamber being in restricted communication with the pilot regulator outlet and in unrestricted communication with the main regulator outlet.

16. A pressure regulating and reducing apparatus comprising in combination, a main regulator and a pilot regulator, each of the said regulators having an inlet, an outlet, and a valve interposed between the inlet and outlet, the main regulating valve opening against inlet pressure and the pilot regulating valve opening with inlet pressure, a main fluid responsive device for operating the said main valve, means operatively connecting the said device with the pilot regulator outlet, and means including a constricted passage connecting the pilot regulator outlet with the main regulator outlet, the last-named means including two opposed diaphragms of unequal size defining opposite walls thereof, each of the two last-named diaphragms being connected with the pilot regulator valve, the said chamber being in unrestricted communication with the main regulator outlet and in restricted communication with the pilot regulator outlet, the ratio of the effective valve-seating area of the main valve to the effective area of the said main fluid pressure-responsive device being substantially equal to the ratio of the effective valve-seating area of the pilot valve to the effective area of the smaller of the said opposed diaphragms of unequal size.

17. In a pressure regulating and reducing apparatus, the combination of a main regulator, and a pilot regulator for supplying pressure to operate the main regulator; each of the said regulators having a valve cooperating with a valve seat; one of said regulator valves being adapted to open with inlet pressure and the other regulator valve being adapted to open against inlet pressure; resilient means in each of said regulators for actuating each of said valves in one direction, and a fluid pressure-actuated diaphragm in each of said regulators having an area responsive to the delivery pressure of both the pilot regulator and the main regulator for actuating each of said valves in opposition to the said resilient means; the ratio of the effective area of the valve to the effective area of the diaphragm in each regulator being equal for both regulators.

GEORGE H. SMITH.
WILGOT J. JACOBSSON.